United States Patent [19]
Hoefkes

[11] Patent Number: 5,210,912
[45] Date of Patent: May 18, 1993

[54] COUPLING MEMBER AND CLEAT

[76] Inventor: Heiner J. Hoefkes, 4218 Melia Drive, Mississauga, Ontario, Canada, L5C 4J5

[21] Appl. No.: 895,653

[22] Filed: Jun. 9, 1992

[51] Int. Cl.⁵ ............................................. A44B 11/00
[52] U.S. Cl. ................................ 24/131 R; 24/129 C; 24/546
[58] Field of Search ............. 24/131 R, 131 C, 129 C, 24/546, DIG. 10, 3 D, 908, 67.9

[56] References Cited

U.S. PATENT DOCUMENTS

| | | | |
|---|---|---|---|
| 614,966 | 11/1898 | Marston | 24/131 R |
| 706,855 | 8/1902 | Schmelz | 24/131 R |
| 1,054,107 | 2/1913 | Galbraith | 24/131 R |
| 1,280,393 | 10/1918 | Cannon | 24/131 R |
| 1,548,927 | 8/1925 | Barrell | 24/131 R |
| 1,810,242 | 6/1931 | Hayes | 24/131 R |
| 2,169,298 | 8/1939 | Sorensen | 24/131 R |
| 3,055,332 | 9/1962 | Linsdeau | 24/131 C |

FOREIGN PATENT DOCUMENTS

| | | | |
|---|---|---|---|
| 0171964 | 1/1952 | Austria | 24/131 R |
| 0677072 | 5/1939 | Fed. Rep. of Germany | 24/131 R |

Primary Examiner—Victor N. Sakran

[57] ABSTRACT

A curved rod-like member defines two right facing and two left facing bights. These may each receive a bight of a rope and by use of the member thus connected many coupling features are provided. Member shaping to align the bights and avoid rotary torque is provided.

5 Claims, 5 Drawing Sheets

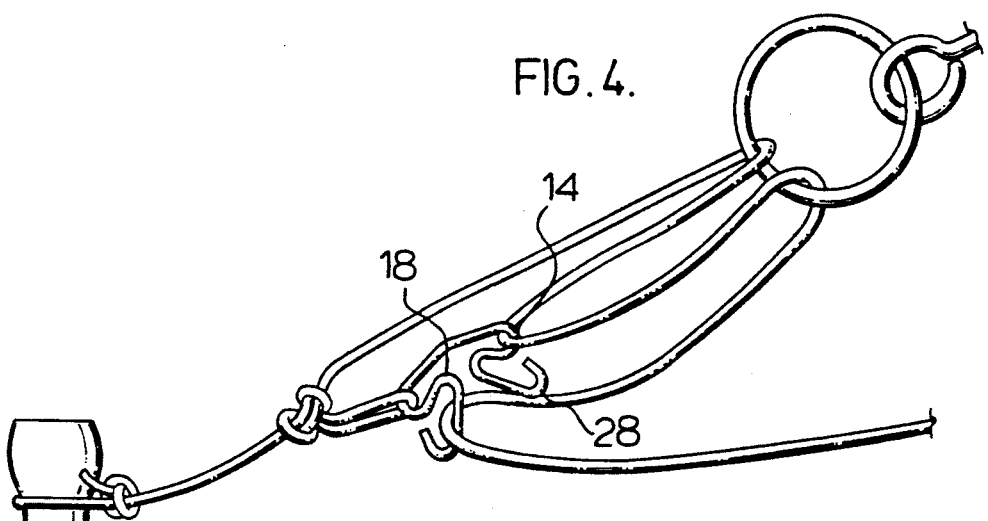
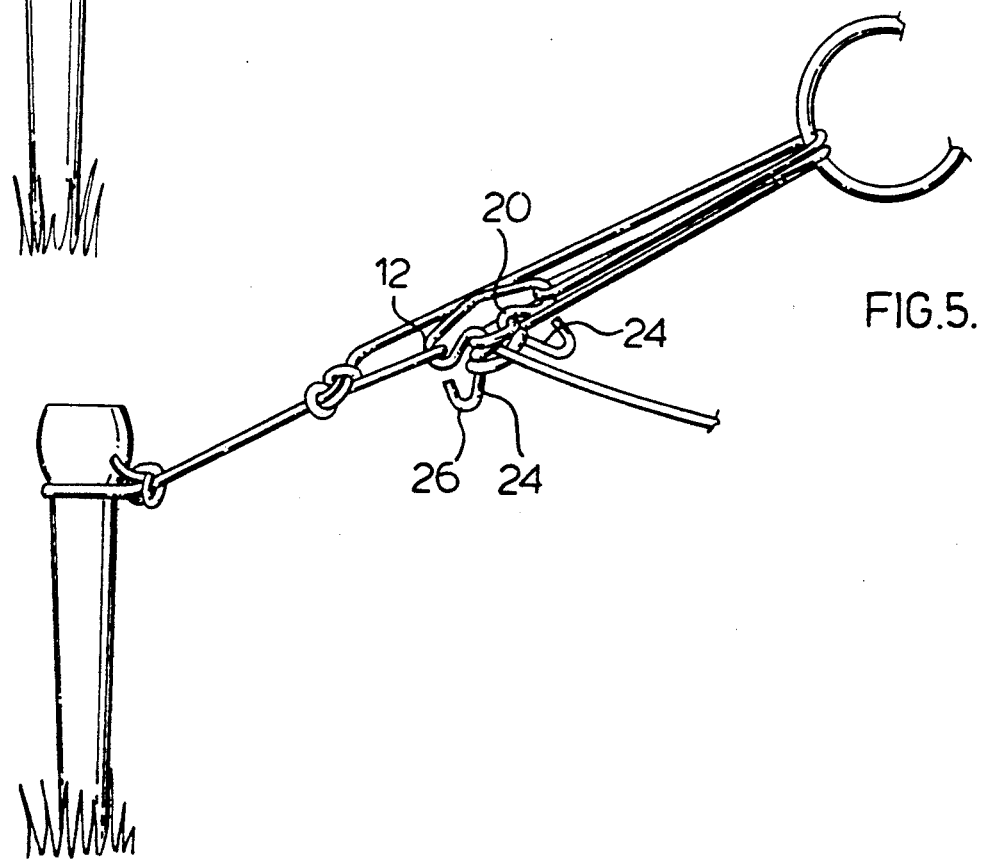

COUPLING MEMBER AND CLEAT

This invention relates to a coupling member for use with rope or rope like materials.

The word 'rope' herein includes cable, filament, flexible wire twine and any filamentary flexible article.

The words 'rod', 'rod like member' often refer to stiff metal wire curved to form the shape described but include plastic or metal members originally moulded, cast, or otherwise formed into the shape described.

The invention deals with a member which comprises a unitary longitudinally extending member assuming a specific (self sustaining) shape wherein all the extents and bights of the wire are in (approximately) in the same plane. It is found easier to define the relation of the extents and bights to each other in a static setting for the member in terms of 'upper' 'horizontal' and 'lower'. It should be noted therefore that 'upper' 'horizontal' and 'lower' are used for ease in describing the relationship of the elements in a static location and orientation and are not meant to imply any continuing orientation. Thus an 'upper' member could, in the use of the inventive member, be lower, lateral or otherwise disposed relative to a 'lower' member and a 'horizontal' direction can, in use, be in any direction.

The preferred form of the rod is a thick relatively stiff wire, usually resilient to bending stresses but strong enough not to collapse or deform unduly under moderate tensile stresses exerted by a rope on the rod. The term rod herein includes both resilient and rigid members in the form described and includes rigid members of plastic or other material having the shape of a wire when bent, moulded or otherwise formed to the shape described herein. The member will usually be made of steel but may be made of another metal or plastic.

It is noted that using a rope for tie-down or other purposes, pulleys may be used to allow the user to obtain a mechanical advantage of 2:1, 4:1, 5:1 or other multiple of the tensile force applied by the rope. Pulleys and pulley blocks are expensive. This invention provides an economical simple and compact device reproducing a pulley action to produce mechanical advantage or the multiples of the applied tensile force.

It is noted that there are, for use with rope ties, cleats or equivalent members, devices which allow the end of a tightened rope to lie fixed when drawn taut. However such cleats or equivalent devices are expensive and may be bulky. The device described herein provides rod extents diverging to free ends, which device in accord with the invention is simple and inexpensive and for the purposes with which the invention is concerned is equivalent to a cleat. The divergent members preferably form part of a unitary member which includes the means for obtaining the mechanical advantage mentioned above.

'Sideways' or 'lateral' 'in relation to a rope' means a direction having a large component perpendicular to the longitudinal axis of the rope at the relevant part. The inventive member, wherein the rope may be moved sideways to a desired location, has considerable advantage over a device wherein the rope must be threaded axially through apertures.

In one aspect the invention comprises a unitary wire bent or shaped to provide an upper coupling first extent, extending generally horizontally and terminating in convex outward first bights. The wire provides second extents running inward from the lower end of the first bights to respective second bights which are convex inward second bights. The respective second bights are horizontally spaced to allow upward entrance of a rope to couple to the first extent or to the inside of the first bights, in a direction which is sideways relative to the rope.

In a preferred aspect of the invention the invention described so far has the upper first extent sloping upwardly from the first bights toward the middle of the first extent and the second extents sloping upwardly from the first to the second extent. This provides that the four bights in the device are more nearly aligned because of the sloping extents than if such extents were horizontal and parallel, thus reducing unwanted rotational torque on the member when opposed tensile stresses are applied to the bight.

In a preferred aspect of the invention, the spacing between said first extent and the respective second extents toward the centre of the member. Thus the narrowed portion, while spaced to allow sideways movement of a rope to the second bights with at least a friction fit, inhibits sideways escape of a rope from the vicinity of a second bight, particularly when the rope is slack.

The device described so far has many advantages which will be apparent from the specific description to follow. However two of importance are now referred to. In prior use of rope for obtaining mechanical (or other) advantage it is sometimes necessary to place two bights of a rope length over a single ring or bar. When the rope is pulled there are four flights of rope moving over the ring or bar with two flights moving in each direction, frequently with frictional contact. Such frictional contact which is very high with many ropes decreases the useful tensile force transmitted by the rope. The inventive device provides 2 or 3 individual seats for individual rope bights in each direction (that is 4 to 6 individual seats in all) which decreases the friction and frictional losses in comparison to prior devices.

Prior devices for tying the end of a rope whose useful length is adjustable must be dimensioned for a suitable size of rope. With a toggle, for example, the correspondence must be sufficiently precise that the rope is usually sold with the toggle. With applicant's device any diameter of rope may be used which is not too big for the rod bight. The fact that this invention may be supplied in varying sizes to suit differing rope diameters and tensile stresses does not detract from the above advantage.

In a preferred aspect of the invention, wires from the lower ends of the second bights diverge downwardly to form a funnel to guide rope being moved sideways upwardly between the second bights. This reduces the time required to couple the rope to the first bights or the main coupling extent.

In a preferred aspect of the invention the wire extending downwardly from each second bight is curved outwardly to form a third bight and provide a free end extending toward a point on the adjacent second bight inward of the outermost part thereof but spaced from such second bight sufficiently to allow sideways movement of rope into the third bight. The third bights form convex outward shapes having much less likelihood of injury to a user than would straight extents to an outward facing free end. The third bight also provides further convenient rope coupling points.

The most relevant prior art known to applicant is as follows:

| | | | |
|---|---|---|---|
| 614,966 | Marston | 1,441,737 | Mickelson |
| 2,169,298 | Sorensen | 2,245,878 | Sorensen |
| 3,353,232 | Brownson | 3,069,739 | Jorgenson et al. |
| 3,930,288 | Black et al. | 5,008,983 | Heins |

The most relevant patent appears to be Sorenson U.S. Pat. No. 2,169,298. This patent shows two left handed and two right handed bights which can be coupled to rope without threading, as in applicant's design. However the Sorenson bights are not arranged on wire lengths sloped to reduce misalignment under tensile pull. Sorensen moreover does not provide a cleat with diverging wire lengths and hook ends. Sorenson has a long extent 5 suitable for tying but he does not provide a tapering guide as does applicant.

The next most relevant patent is that of Marston which is topologically similar to Sorenson '298 with a less compact shape and an extra eye 3.

Neither Sorenson '298 nor Marston show a throat at the entrance to the upper bights as does applicant. Both Sorenson and Marston show outwardly directed wire ends which are a menace to eyes and skin and which applicant avoids.

The remaining patents are not thought to be relevant. Although they show useful devices for rope coupling they have eyes which require threading of the rope rather than sideways sliding which applicant's device allows.

In drawings which illustrate a preferred embodiment of the inventive member:

Figure 2:
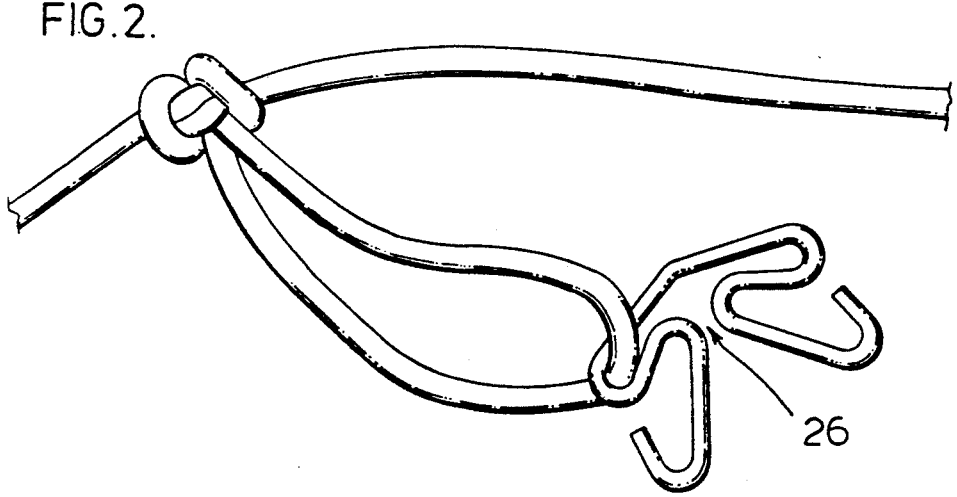
FIG. 2 shows the member with a knotted rope loop surrounding its first extent.
Figure 3:
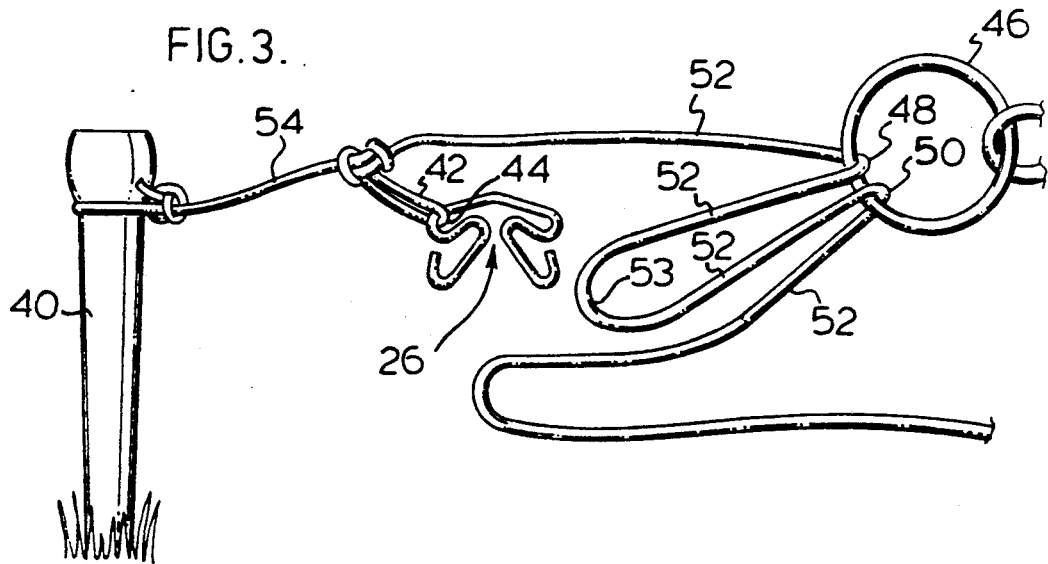
Figure 6:
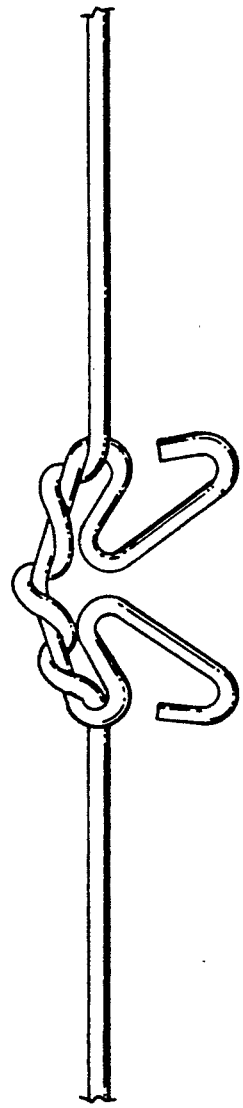
Figure 7:
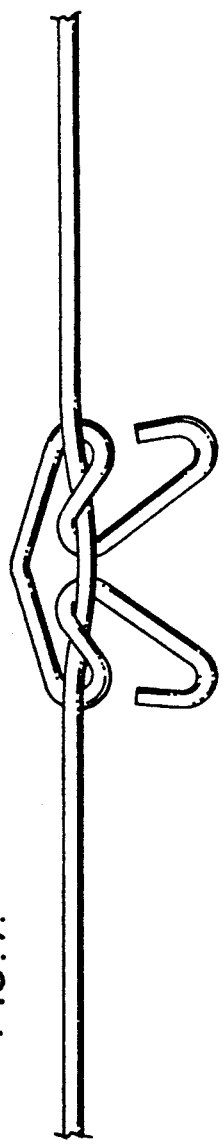

FIG. 3 shows the rope of FIG. 2 with two bights for sideways movement into two member bights, FIG. 4 shows the rope bights of FIG. 3 applied to the appropriate member bights, FIG. 5 shows the result when the rope and member arrangement of FIG. 4 has the rope drawn taut with its end cleated to the member, and FIG. 6 and 7 show two, (of many) alternate arrangements for coupling the rope to the first extent.

Figure 8:
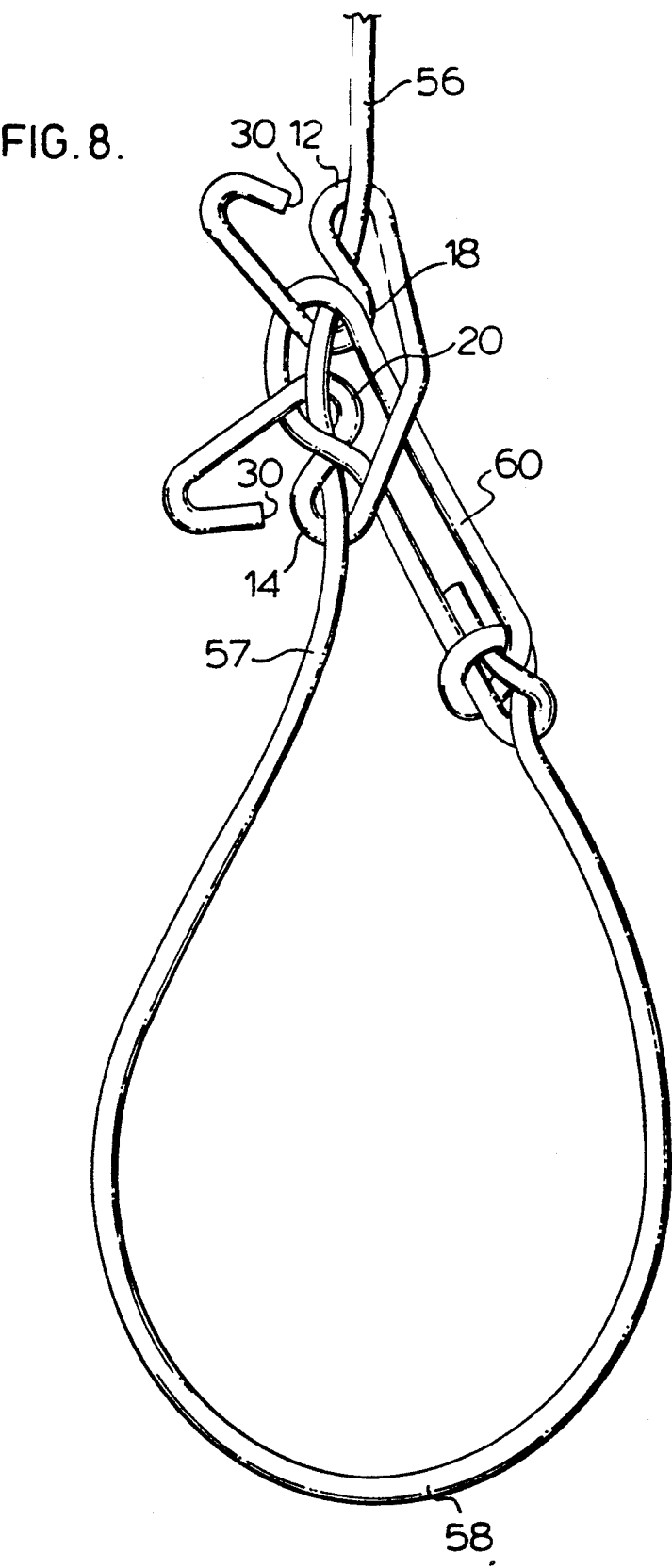
Figure 9:
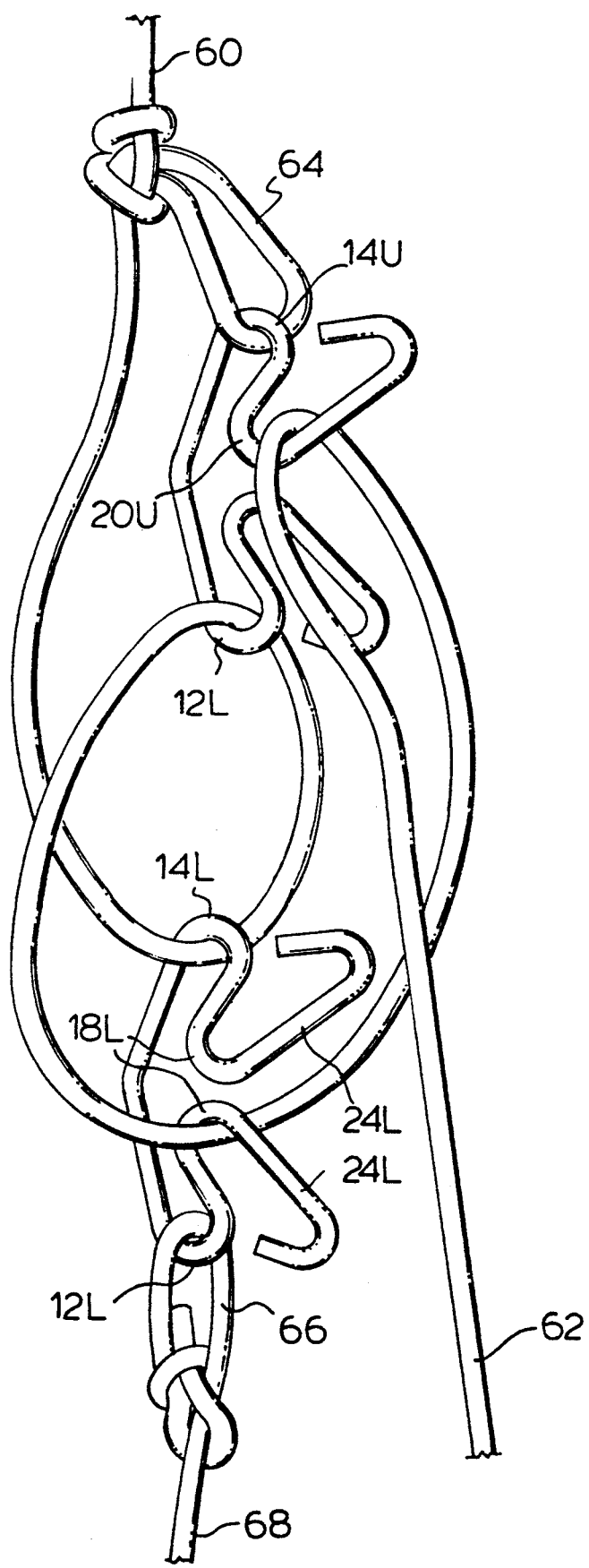

FIGS. 8 and 9 show useful applications of the inventive device.

Figure 1:
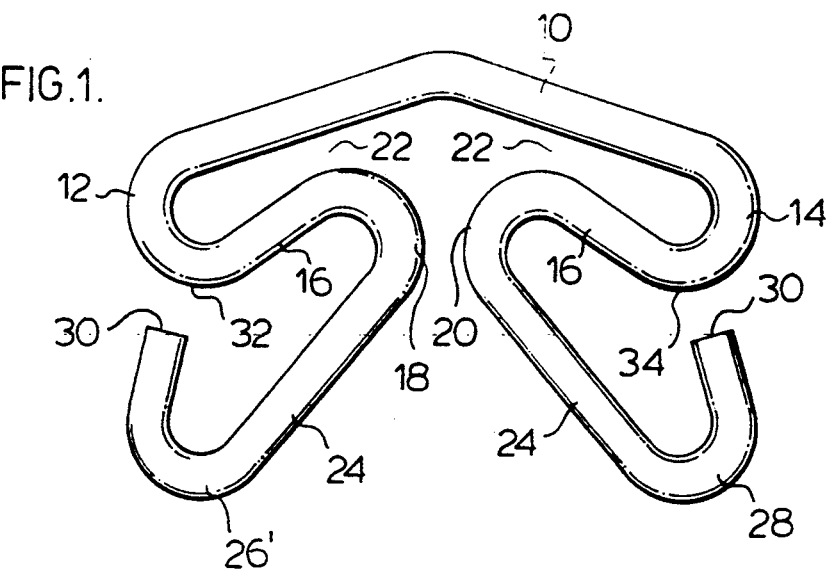
FIG. 1 is a view of the member perpendicular to its median plane.

In the drawings the unitary member is bent as shown and its axis lies in a median plane, which, in FIG. 1 is the plane of the paper and includes main coupling first extent 10 extending between the upper end of a convex outward first bight 12 and the upper end of a convex outward first bight 14. Preferably the first extent 10 slopes upwardly from each of the first bights to the middle. The lower end of each first bight extends along a second extent 16 to the upper end of second convex inward facing bights 18 and 20. Preferably the second extents 16 slope upwardly in an inward direction between each first and second bight. Preferably the upward slope of the second extents 16 is somewhat greater than the slope of the adjacent portion of the first extent 10. The spacing between the members thus narrows toward a throat 22 at the middle. The size of the member is selected to suit the size of rope used, or vice versa, so that with a good match the rope will pass throat 22 sideways, with a friction fit, but move loosely inside bight 12 or 14. The narrow throat 22 inhibits any tendency of the rope to slide sideways out of the bight, particularly when the rope is slack. The slopes of first extent 10 and the slopes of second extent 16 reduce the amount of horizontal alignment of the first and second bights in a horizontal direction thus reducing rotary torque caused by rope tension. Neither of these features is shown by the Marston or Sorenson '298 references.

A third extent 24 of the wire extends downwardly from the lower end of each second bight. The extents 24 diverge in a downward direction and thus provide a guide or funnel 26 to rope being moved sideways and upwardly to couple to first extent 10 or at a first bight 12 or 14. The diverging extents 24 are available to provide a cleating action as hereinafter described. This is not shown by the Marston and Sorenson '281 reference.

The lower end of each of third extents 24 is curved outwardly to form third bights 26' and 28 and these bights are curved so that the free ends 30 are directed toward respective points inward of the outermost portions of second bights 12 and 14. The free ends are however spaced sufficiently from the respectively adjacent portions 32 and 34 second bights 12 and 14 to admit a rope sideways into the respective second bights 18 and 20.

The outside surfaces of the third bights and the inward direction of the free ends 30 is much less likely to cause eye or other injuries during use or handling than straight outwardly directed ends of the prior art. The third bights form additional rope coupling points.

The member may be made of many materials including plastic moulded in the shape of FIG. 1. I prefer to use relatively stiff, slightly resilient, 1018 SAE carbon steel, originally straight and bent to form the member as described.

In operation as shown in FIGS. 1 to 5 one use of the rope is shown. The rope is attached to a leftward anchor (here post 40). The rope is formed with a knotted loop 42 and the rope bight 44 of the loop is slid sideways up the funnel 26 and between second bights 18 and 20 to couple the rope to first extent 10 as shown in FIG. 2.

The rope bight 53 is then threaded about a rightward anchor a connector (here ring 46) connected to anchor means not shown then back through convex rightward bight 14 again through the ring 46 then the convex rightward second bight 18. The rope end is then drawn tightly leftward and it will be noted that a four to one mechanical advantage is achieved. When the rope is drawn sufficiently tightly it is cleated by being wound in a FIG. 8 arrangement as shown about third extents 24 outward from bights 18 and 20.

It will be obvious that other cleating patterns (such as a clove hitch) may be used for cleating and using extents 24 instead of that shown. It will be obvious that the cleating may be used with other bight couplings. It will be obvious that other mechanical advantages may be derived using a rope and the member, including 2:1 and 3:1.

The ring 46 forms no part of the present invention and is inserted herein as an example of a fixed support with a bar (ring 46) on which the two rightward rope bights 48 and 50 may pull. Obviously if separate rings or bars for the bights 48 and 50 there would be no frictional contact between the four rope flights 52 leading to the bights. Obviously the frictional contacts between the ropes at bights 48 and 50 subtracts from the useful tensile force and in this sense reduces the mechanical advantage of the arrangement.

The problems inherent in the use of a single ring 46 for two bights emphasizes an advantage of applicants device. In applicants device at least two rightward bights 14 and 18 provide two individual seats for rope preventing frictional interaction between the ropes in the two bights. In some arrangements the bight 28 provides a third seat for rightward extending ropes. Similarly bights 12, 20 and 26' provide individual seats for ropes.

The post 40 forms no part of the invention and can represent any anchor for the leftward extending length of rope 54.

FIGS. 6 and 7 show other couplings of the rope to the first extent for other purposes. For example the third bights 26' or 28 may be used to attach other ropes or other rope loops for other purposes. Obviously for use in functions such as those of FIGS. 1-5 the couplings of FIGS. 6 and 7 would not be used since they allow sliding of the member relative to the rope.

FIG. 8 shows a useful function of the inventive device for adjusting the rope length between a standing rope portion 56 and a rope bight 58. The rope from length 56 is attached to the device to pass, (downwardly in the figure) downward through bights 12 and 20 and upward through bights 18 and 14. A loop 60 is formed (preferably by a 'bowline' knot) in the rope end and fastened under the first extents 10 and over free ends 30. With this arrangement the distance between standing portion 56 and rope bight 58 may be easily adjusted, while the rope is slack, by pulling the standing portion 56 (or its lower equivalent 57 in either direction relative to the device and rope loop.) However, when the rope is pulled taut between 56 and 58 the loop 60 firmly clamps the standing portion of the rope to bights 18, 20 and 14 fixing the length of the rope when under tension. Removal of the tension allows adjustment of the rope.

FIG. 9 shows use of two of the inventive devices to obtain a 5:1 advantage in obtaining a taut rope and tensile pull without the frictional disadvantages contributed by the ring in FIGS. 3-5. In FIG. 9 the rope at 60 (extending downward from an upper anchor, not shown, to the rope free end 62. A loop 64, preferably a 'butterfly knot' is provided to rest in bight 14U of the upper device. A loop 66 preferably a 'bowline' knot is of a separate rope 68 is connected to a lower anchor not shown. Loop 66 is placed in bight 12L. The upper rope is then successively seated in lower bight 14L, upper bight 12U, lower bight 18L and upper bight 20U. The end 62 is then drawn taut (with a 5:1 mechanical advantage) until ropes 60 and 68 are taut after which the rope 62 may be quickly cleated on third extents 24L as with the cleating shown in FIG. 5.

By 'anchor' herein is meant a fixed datum to which a rope bight or knot can be attached.

It should be noted that when any rope slides over any extent of the device, in any uses of the invention, there is friction which subtracts a force from that applied and from the mechanical advantage. However with a smooth metal rod used in the device, the friction is very little more than with a pulley block.

In all alternatives used it will be found that, in contrast to prior devices the use of the device is independent of the rope size used, as long as the rope size will fit into the respective bights.

A further advantage of the invention is demonstrated by the examples shown in that in almost all cases the rope may be moved laterally or sideways into the respective bights without the necessity of axial threading which is required by devices using eyelets, thus much increasing the speed of the tying operation with the inventive device.

I claim:

1. Rope coupling member, comprising, a curved rod-like member defining a median plane when viewed in such median plane having an upper first extent extending laterally between left and right, the rod, at each end of said upward extent curving downwardly to form convex outward first bight, second rod extents from the lower portion of said first bights extending toward each other and at their proximate ends curved to form convex inward second bights, said respective second bights being laterally spaced for upward entrance of a rope in a direction which is lateral with respect to said rope, said first and second rod extents being spaced to allow entrance of a rope into either of said first bights in a direction which is sideways with respect to said rope, the rod extents leading to said second bights being spaced to allow entrance of a rope into either of said second bights in a direction sideways with respect to said rope, said upper first extent sloping upwardly toward the middle and each said second extents sloping upwardly between said first bight and said second bight.

2. Rope coupling member, comprising, a curved rod-like member defining a median plane when viewed in such median plane having an upper coupling first extent extending laterally between left and right, the rod, at each end of said upward extent curving downwardly to form convex outward first bight, second rod extents from the lower portion of said first bights extending toward each other and at their proximate ends curved to form convex inward second bights, said respective second bights being laterally spaced for upward entrance of a rope in a direction which is lateral with respect to said rope, said first and second rod extents being spaced to allow lateral entrance of a rope into either of said first bights in a direction which is sideways with respect to said rope, the rod extents leading to said second bights being spaced to allow entrance of a rope into either of said second bights in a direction sideways with respect to said rope, the spacing between said second extents and said first extent narrowing in the direction away from the respective first bights.

3. Rope coupling member, comprising, a curved rod-like member defining a median plane when viewed in such median plane having an upper coupling first extent extending laterally between left and right, the rod, at each end of said upward extent curving downwardly to form convex outward first bight, second rod extents from the lower portion of said first bights extending toward each other and at their proximate ends curved to form convex inward second bights, said respective second bights being laterally spaced for upward entrance of a rope in a direction which is lateral with respect to said rope, said first and second rod extents being spaced to allow entrance of a rope into either of said first bights in a direction which is sideways with respect to said rope, the rod extents leading to said second bights being spaced to allow entrance of a rope into either of said second bights in a direction sideways with respect to said rope, a third extent of said rod extending from the lower portion of each said second bight, said third extents diverging downwardly.

4. Coupling member as claimed in claim 3 wherein the lower extremities of said third extents are each bent away from the other extent to form a curved downward third bight, which third bight has on the end remote from the third extent a free end directed toward a point inward of the outermost portion of the second bight.

5. Rope coupling member, comprising, a curved rod-like member defining a median plane when viewed in such median plane having an upper coupling first extent extending laterally between left and right, the rod, at each end of said upward extent curving downwardly to form convex outward first bight, second rod extents from the lower portion of said first bights extending toward each other and at their proximate ends curved to form convex inward second bights, said respective second bights being laterally spaced for upward entrance of a rope in a direction which is lateral with respect to said rope, said first and second rod extents being spaced to allow entrance of a rope into either of said first bights in a direction which is sideways with respect to said rope, the rod extents leading to said second bights being spaced to allow entrance of a rope into either of said second bights in a direction sideways with respect to said rope, the wire extending downwardly from each of said second bights being curved outwardly to form a third bight and providing a free end directed toward a point on said second bight located inwardly of the outermost portion thereof, and spaced from the nearest other extent of said rod to allow admission of said rope sideways relative to said rope into said third bight.

* * * * *